United States Patent
Laefer et al.

(10) Patent No.: US 7,797,471 B2
(45) Date of Patent: Sep. 14, 2010

(54) METHOD AND SYSTEM FOR TRANSFERRING ALBUM ARTWORK BETWEEN A MEDIA PLAYER AND AN ACCESSORY

(75) Inventors: Jay S. Laefer, Sunnyvale, CA (US); Gregory T. Lydon, Santa Cruz, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 11/476,338

(22) Filed: Jun. 27, 2006

(65) Prior Publication Data

US 2007/0233295 A1 Oct. 4, 2007

(51) Int. Cl.
G06F 13/42 (2006.01)
G06F 3/00 (2006.01)

(52) U.S. Cl. ....................... 710/105; 715/732

(58) Field of Classification Search .................. 710/33, 710/105; 700/94; 715/719–732, 736
See application file for complete search history.

(56) References Cited

U.S. PATENT DOCUMENTS

| | | | |
|---|---|---|---|
| 4,673,861 A | 6/1987 | Dubovsky et al. | |
| 4,850,899 A | 7/1989 | Maynard | |
| 4,916,334 A | 4/1990 | Minagawa et al. | |
| 4,924,216 A | 5/1990 | Leung | |
| 4,938,483 A | 7/1990 | Yavetz | |
| 5,041,025 A | 8/1991 | Haitmanek | |
| 5,055,069 A | 10/1991 | Townsend et al. | |
| 5,080,603 A | 1/1992 | Mouissie | |
| 5,104,243 A | 4/1992 | Harding | |
| 5,108,313 A | 4/1992 | Adams | |
| 5,150,031 A | 9/1992 | James et al. | |
| 5,186,646 A | 2/1993 | Pederson | |

(Continued)

FOREIGN PATENT DOCUMENTS

EP 1104150 5/2001

(Continued)

OTHER PUBLICATIONS

Jill Slay; Andrew Przibilla; , "iPod Forensics: Forensically Sound Examination of an Apple iPod," System Sciences, 2007. HICSS 2007. 40th Annual Hawaii International Conference on , pp. 1-9, Jan. 2007.*

(Continued)

*Primary Examiner*—Mark Rinehart
*Assistant Examiner*—Faisal M Zaman
(74) *Attorney, Agent, or Firm*—Townsend and Townsend and Crew LLP

(57) ABSTRACT

A method, system, and connector interface for transferring album artwork between a media player and an accessory. The method comprises obtaining, by the accessory, artwork information associated with album artwork from the media player; and obtaining, by the accessory, the album artwork from the media player based on the artwork information. According to the system and method disclosed herein, the media player and accessory may utilize a plurality of commands utilized in a variety of environments, such as within a connector interface system environment, to facilitate the transfer of album artwork.

17 Claims, 14 Drawing Sheets

U.S. PATENT DOCUMENTS

| | | | |
|---|---|---|---|
| 5,247,138 A | 9/1993 | Landmeier | |
| 5,277,624 A | 1/1994 | Champion | |
| 5,471,128 A | 11/1995 | Patino et al. | |
| 5,525,981 A | 6/1996 | Abernethy | |
| 5,586,893 A | 12/1996 | Mosquera | |
| 5,592,588 A | 1/1997 | Reekes et al. | |
| 5,618,045 A | 4/1997 | Kagan et al. | |
| 5,648,712 A | 7/1997 | Hahn | |
| 5,660,558 A | 8/1997 | Osanai et al. | |
| 5,727,866 A | 3/1998 | Kraines et al. | |
| 5,732,361 A | 3/1998 | Liu | |
| 5,754,027 A | 5/1998 | Oglesbee et al. | |
| 5,830,001 A | 11/1998 | Kinoshita | |
| 5,835,862 A | 11/1998 | Nykanen et al. | |
| 5,845,217 A | 12/1998 | Lindell et al. | |
| 5,859,522 A | 1/1999 | Theobald | |
| 5,901,049 A | 5/1999 | Schmidt et al. | |
| 5,964,847 A | 10/1999 | Booth, III et al. | |
| 5,975,957 A | 11/1999 | Noda et al. | |
| 6,012,105 A | 1/2000 | Rubbmark et al. | |
| 6,031,797 A | 2/2000 | Van Ryzint et al. | |
| 6,078,402 A | 6/2000 | Fischer et al. | |
| 6,078,789 A | 6/2000 | Bodenmann et al. | |
| 6,125,455 A | 9/2000 | Yeo | |
| 6,130,518 A | 10/2000 | Gabehart et al. | |
| 6,139,373 A | 10/2000 | Ward et al. | |
| 6,154,773 A | 11/2000 | Roberts et al. | |
| 6,154,798 A | 11/2000 | Lin et al. | |
| 6,161,027 A | 12/2000 | Poirel | |
| 6,169,387 B1 | 1/2001 | Kaib | |
| 6,175,358 B1 | 1/2001 | Scott-Jackson et al. | |
| 6,178,514 B1 | 1/2001 | Wood | |
| 6,184,652 B1 | 2/2001 | Yang | |
| 6,184,655 B1 | 2/2001 | Malackowski | |
| 6,188,265 B1 | 2/2001 | Liu et al. | |
| 6,203,345 B1 | 3/2001 | Roque et al. | |
| 6,204,637 B1 | 3/2001 | Rengan | |
| 6,206,480 B1 | 3/2001 | Thompson | |
| 6,211,581 B1 | 4/2001 | Farrant | |
| 6,211,649 B1 | 4/2001 | Matsuda | |
| 6,224,420 B1 | 5/2001 | Nishio et al. | |
| 6,230,205 B1 | 5/2001 | Garrity et al. | |
| 6,234,827 B1 | 5/2001 | Nishio et al. | |
| 6,252,380 B1 | 6/2001 | Koenck | |
| 6,261,109 B1 | 7/2001 | Liu et al. | |
| 6,262,723 B1 * | 7/2001 | Matsuzawa et al. | 715/723 |
| 6,267,623 B1 | 7/2001 | Hisamatsu | |
| 6,268,845 B1 | 7/2001 | Pariza et al. | |
| 6,271,605 B1 | 8/2001 | Carkner et al. | |
| 6,272,328 B1 | 8/2001 | Nguyen et al. | |
| 6,280,251 B1 | 8/2001 | Nishio et al. | |
| 6,283,789 B1 | 9/2001 | Tsai | |
| 6,304,764 B1 | 10/2001 | Pan | |
| 6,314,479 B1 | 11/2001 | Frederick et al. | |
| 6,316,916 B2 | 11/2001 | Bohne | |
| 6,322,396 B1 | 11/2001 | Kuan | |
| 6,344,727 B1 | 2/2002 | Desai et al. | |
| 6,353,894 B1 | 3/2002 | Pione | |
| 6,358,089 B1 | 3/2002 | Kuroda et al. | |
| 6,372,974 B1 | 4/2002 | Gross et al. | |
| 6,385,596 B1 | 5/2002 | Wiser et al. | |
| 6,394,905 B1 | 5/2002 | Takeda et al. | |
| 6,429,879 B1 | 8/2002 | Sturgeon et al. | |
| 6,431,915 B1 | 8/2002 | Ko | |
| 6,453,371 B1 | 9/2002 | Hampson et al. | |
| 6,454,592 B2 | 9/2002 | Takagi | |
| 6,461,173 B1 | 10/2002 | Mizuno et al. | |
| 6,464,542 B1 | 10/2002 | Lee | |
| 6,468,110 B2 | 10/2002 | Fujino et al. | |
| 6,478,603 B1 | 11/2002 | Wu | |
| 6,483,428 B1 | 11/2002 | Fish et al. | |
| 6,485,328 B1 | 11/2002 | Wu | |
| 6,489,751 B2 | 12/2002 | Small et al. | |
| 6,501,441 B1 * | 12/2002 | Ludtke et al. | 345/1.1 |
| 6,505,160 B1 * | 1/2003 | Levy et al. | 704/270 |
| 6,524,119 B2 | 2/2003 | Kato et al. | |
| 6,526,287 B1 | 2/2003 | Lee | |
| 6,558,201 B1 | 5/2003 | Begley et al. | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,399 B2 | 8/2003 | McConnell et al. | |
| 6,616,473 B2 | 9/2003 | Kamata et al. | |
| 6,629,197 B1 | 9/2003 | Bhogal et al. | |
| 6,642,629 B2 | 11/2003 | DeLeeuw | |
| 6,651,138 B2 | 11/2003 | Lai et al. | |
| 6,653,813 B2 | 11/2003 | Khatri | |
| 6,663,420 B1 | 12/2003 | Xiao | |
| 6,665,803 B2 | 12/2003 | Lunsford et al. | |
| 6,674,995 B1 | 1/2004 | Meyers et al. | |
| 6,687,454 B1 * | 2/2004 | Kuroiwa | 386/96 |
| 6,697,944 B1 | 2/2004 | Jones et al. | |
| 6,724,339 B2 | 4/2004 | Conway et al. | |
| 6,725,061 B1 | 4/2004 | Hutchison, IV et al. | |
| 6,728,729 B1 | 4/2004 | Jawa et al. | |
| 6,747,859 B2 | 6/2004 | Walbeck et al. | |
| 6,754,468 B1 | 6/2004 | Sieben et al. | |
| 6,761,635 B2 | 7/2004 | Hoshino et al. | |
| 6,774,939 B1 * | 8/2004 | Peng | 348/231.4 |
| 6,776,626 B2 | 8/2004 | Huang et al. | |
| 6,776,660 B1 | 8/2004 | Kubota et al. | |
| 6,776,665 B2 | 8/2004 | Huang | |
| 6,801,964 B1 * | 10/2004 | Mahdavi | 710/35 |
| 6,813,528 B1 | 11/2004 | Yang | |
| 6,830,160 B2 | 12/2004 | Risolia | |
| 6,859,538 B1 | 2/2005 | Voltz | |
| 6,859,854 B2 | 2/2005 | Kwong | |
| 6,879,843 B1 | 4/2005 | Kim | |
| 6,928,295 B2 | 8/2005 | Olson et al. | |
| 6,931,266 B2 | 8/2005 | Miyoshi et al. | |
| 6,931,456 B2 | 8/2005 | Payne et al. | |
| 6,939,177 B2 | 9/2005 | Kato et al. | |
| 6,991,483 B1 | 1/2006 | Milan et al. | |
| 7,004,787 B2 | 2/2006 | Milan | |
| 7,013,164 B2 | 3/2006 | Lin | |
| 7,187,947 B1 | 3/2006 | White et al. | |
| 7,050,783 B2 | 5/2006 | Curtiss et al. | |
| 7,054,888 B2 | 5/2006 | La Chapelle et al. | |
| 7,062,261 B2 | 6/2006 | Goldstein et al. | |
| 7,108,560 B1 | 9/2006 | Chou et al. | |
| 7,127,678 B2 | 10/2006 | Bhesania et al. | |
| 7,127,879 B2 | 10/2006 | Zhu et al. | |
| 7,167,112 B2 | 1/2007 | Andersen et al. | |
| 7,167,935 B2 | 1/2007 | Hellberg | |
| 7,187,948 B2 | 3/2007 | Alden | |
| 7,215,042 B2 | 5/2007 | Yan | |
| 7,281,214 B2 | 10/2007 | Fadell | |
| 7,293,122 B1 | 11/2007 | Schubert et al. | |
| 7,293,227 B2 * | 11/2007 | Plastina et al. | 707/E17.02 |
| 7,299,304 B2 * | 11/2007 | Saint-Hilaire et al. | 710/11 |
| 7,303,282 B2 | 12/2007 | Dwyer et al. | |
| 7,304,685 B2 | 12/2007 | Park et al. | |
| 7,305,254 B2 | 12/2007 | Findikli | |
| 7,305,506 B1 | 12/2007 | Lydon et al. | |
| 7,362,963 B2 * | 4/2008 | Lin | 386/125 |
| 7,415,563 B1 | 8/2008 | Holden et al. | |
| 7,441,058 B1 | 10/2008 | Bolton et al. | |
| 7,444,388 B1 | 10/2008 | Svendsen | |
| 7,454,019 B2 * | 11/2008 | Williams | 380/203 |
| 7,526,588 B1 | 4/2009 | Schubert et al. | |
| 7,529,870 B1 | 5/2009 | Schubert et al. | |
| 7,529,871 B1 | 5/2009 | Schubert et al. | |
| 7,529,872 B1 | 5/2009 | Schubert et al. | |
| 7,558,894 B1 | 7/2009 | Lydon et al. | |

| | | |
|---|---|---|
| 7,587,540 B2 | 9/2009 | Novotney et al. |
| 7,590,783 B2 | 9/2009 | Lydon et al. |
| 7,610,350 B2 * | 10/2009 | Abdulrahiman et al. ...... 709/217 |
| 7,634,605 B2 | 12/2009 | Laefer et al. |
| 7,660,929 B2 | 2/2010 | Novotney et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0025042 A1 | 2/2002 | Saito |
| 2002/0108108 A1 | 8/2002 | Akaiwa et al. |
| 2002/0116533 A1 | 8/2002 | Holliman et al. |
| 2002/0132651 A1 | 9/2002 | Jinnouchi |
| 2002/0152874 A1 | 10/2002 | Vilcauskas et al. |
| 2002/0156949 A1 | 10/2002 | Kubo et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0011608 A1 * | 1/2003 | Wada ........................... 345/581 |
| 2003/0028664 A1 | 2/2003 | Tan et al. |
| 2003/0041206 A1 | 2/2003 | Dickie |
| 2003/0079038 A1 * | 4/2003 | Robbin et al. ................. 709/232 |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0220988 A1 | 11/2003 | Hymel |
| 2003/0237043 A1 * | 12/2003 | Novak et al. .............. 715/500.1 |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0103223 A1 | 5/2004 | Gabehart et al. |
| 2004/0116005 A1 | 6/2004 | Choi |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0022212 A1 | 1/2005 | Bowen |
| 2005/0047071 A1 | 3/2005 | Tse Chun Hin |
| 2005/0135790 A1 * | 6/2005 | Hutten ......................... 386/125 |
| 2005/0149213 A1 | 7/2005 | Guzak et al. |
| 2005/0181756 A1 | 8/2005 | Lin |
| 2005/0198189 A1 * | 9/2005 | Robinson et al. ............. 709/217 |
| 2005/0207726 A1 | 9/2005 | Chen |
| 2005/0227612 A1 | 10/2005 | Helstrom et al. |
| 2005/0239333 A1 | 10/2005 | Watanabe et al. |
| 2005/0240705 A1 | 10/2005 | Novotney et al. |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 * | 3/2006 | Nishizawa et al. ............ 386/3 |
| 2006/0088228 A1 * | 4/2006 | Marriott et al. ............. 382/305 |
| 2006/0161621 A1 | 7/2006 | Rosenberg |
| 2006/0163358 A1 | 7/2006 | Biderman |
| 2006/0168298 A1 * | 7/2006 | Aoki et al. ................... 709/231 |
| 2006/0184456 A1 | 8/2006 | de Janasz |
| 2006/0188237 A1 * | 8/2006 | Watanabe et al. ........... 386/117 |
| 2006/0224620 A1 * | 10/2006 | Silverman et al. ......... 707/104.1 |
| 2006/0236245 A1 | 10/2006 | Agarwal et al. |
| 2006/0247851 A1 | 11/2006 | Morris |
| 2006/0258289 A1 | 11/2006 | Dua |
| 2006/0294209 A1 | 12/2006 | Rosenbloom et al. |
| 2007/0018947 A1 * | 1/2007 | Toro-Lira .................... 345/156 |
| 2007/0056012 A1 | 3/2007 | Kwon et al. |
| 2007/0056013 A1 | 3/2007 | Duncan |
| 2007/0070856 A1 | 3/2007 | Tebele |
| 2007/0080823 A1 | 4/2007 | Fu et al. |
| 2007/0083750 A1 | 4/2007 | Miura et al. |
| 2007/0083814 A1 | 4/2007 | Wilbrink et al. |
| 2007/0086724 A1 | 4/2007 | Grady et al. |
| 2007/0106760 A1 * | 5/2007 | Houh et al. .................. 709/219 |
| 2007/0130592 A1 * | 6/2007 | Haeusel ......................... 725/81 |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0226238 A1 * | 9/2007 | Kiilerich et al. ............. 707/101 |
| 2007/0226384 A1 | 9/2007 | Robbin et al. |
| 2007/0233294 A1 | 10/2007 | Holden et al. |
| 2007/0234420 A1 | 10/2007 | Novotney et al. |
| 2007/0236482 A1 | 10/2007 | Proctor et al. |
| 2007/0247794 A1 * | 10/2007 | Jaffe et al. ................... 361/681 |
| 2008/0025172 A1 | 1/2008 | Holden et al. |
| 2008/0034325 A1 * | 2/2008 | Ording ........................ 715/838 |
| 2009/0013096 A1 | 1/2009 | Novotney et al. |
| 2009/0013110 A1 | 1/2009 | Novotney et al. |
| 2009/0013253 A1 | 1/2009 | Laefer et al. |
| 2009/0125134 A1 | 5/2009 | Bolton et al. |
| 2009/0132076 A1 | 5/2009 | Holden et al. |
| 2009/0198361 A1 | 8/2009 | Schubert et al. |
| 2009/0204244 A1 | 8/2009 | Schubert et al. |
| 2009/0204738 A1 | 8/2009 | Schubert et al. |
| 2009/0210079 A1 | 8/2009 | Schubert et al. |
| 2009/0249101 A1 | 10/2009 | Lydon et al. |
| 2009/0292835 A1 | 11/2009 | Novotney et al. |
| 2009/0299506 A1 | 12/2009 | Lydon et al. |

FOREIGN PATENT DOCUMENTS

| | | |
|---|---|---|
| EP | 1150472 A2 * | 10/2001 |
| EP | 1367734 A1 | 12/2003 |
| EP | 1498899 A | 1/2005 |
| EP | 1594319 A | 11/2005 |
| JP | 07-176351 | 7/1995 |
| JP | 10-321302 | 4/1998 |
| JP | 10-334993 | 12/1998 |
| JP | 11-288420 | 10/1999 |
| JP | 2000-214953 | 8/2000 |
| JP | 2000-223216 | 8/2000 |
| JP | 2000-223218 | 8/2000 |
| JP | 2001-035603 | 2/2001 |
| JP | 2001-069165 A | 3/2001 |
| JP | 2001-196133 | 7/2001 |
| JP | 2001-230021 | 8/2001 |
| JP | 2001-332350 | 11/2001 |
| JP | 2002-025720 | 1/2002 |
| JP | 2002-14304 A | 5/2002 |
| JP | 2002-203641 | 7/2002 |
| JP | 2002 245719 | 8/2002 |
| JP | 2002-252566 | 9/2002 |
| JP | 3090747 U | 10/2002 |
| JP | 2002-342659 | 11/2002 |
| JP | 2002-374447 | 12/2002 |
| JP | 2003-058430 A | 2/2003 |
| JP | 2003-274386 | 9/2003 |
| JP | 2004-078538 A | 3/2004 |
| JP | 2004-259280 A | 9/2004 |
| JP | 2008053955 A * | 3/2008 |
| JP | 2008071419 A * | 3/2008 |
| JP | 2009303001 A * | 12/2009 |
| WO | WO 99/26330 | 5/1999 |
| WO | WO 9948089 A2 * | 9/1999 |

| | | |
|---|---|---|
| WO | WO 00/39907 | 7/2000 |
| WO | WO 00/60450 | 10/2000 |
| WO | WO 02/049314 | 6/2002 |
| WO | WO 03/036541 A1 | 5/2003 |
| WO | WO 03056776 A1 * | 7/2003 |
| WO | WO 03/073688 | 9/2003 |
| WO | WO 2004/084413 | 9/2004 |
| WO | WO 2004-095772 A1 | 11/2004 |
| WO | WO 2004/112311 A | 12/2004 |
| WO | WO 2005/119463 A | 12/2005 |
| WO | WO 2006/080957 A1 | 8/2006 |

OTHER PUBLICATIONS

Hung-Ming Chen; Po-Hong Chen; Tai-Jee Pan; Feipei Lai; , "Design and implementation of a hard disk-based entertainment device for managing media contents on the go," Consumer Electronics, 2005. (ISCE 2005). Proceedings of the Ninth International Symposium on , pp. 328-333, Jun. 14-16, 2005.*
LSI Logic's Broadcast PC Card Brings New MultiMedia Capabilities to Personal Computing. (Nov. 16). PR Newswire,1. Retrieved Jun. 26, 2010, from Business Dateline.*
Altec Lansing, "inMOTION Users Guide," Corp. Headquarters, 535 Rte.6 & 209, Milford, PA 18337.
"ipodDock/iPod Cradle," www.bookendzdocks.com/bookendz/dock_cradle.htm, downloaded Feb. 27, 2003.
Lewis, Peter, "On Technology." *Fortune Magazine*, Dec. 9, 2002.
"Neuros MP3 Digital Audio Computer," www.neurosaudio.com, downloaded Apr. 9, 2003.
"MVP Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.
International Search Report PCT/US2007/072155.
Anonymous: "Future of Digital Music in Windows," Microsoft Windows Hardware Developer Central Archive, [Online] Dec. 4, 2001 URL:http://www.microsoft.com/whdc/archive/digitaudio.mspx> [retrieved on Jan. 15, 2008].
Anonymous; "Windows and Red Book Audio" Micrsoft Windows Hardware Developer Central Archive, [Online] Dec. 4, 2001 URL:http://www.microsoft.com/whdc/archive/Dmfuture.mspx> [retrieved Jan. 15, 2008].
"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html.
Belkin iPod Voice Recorder, Product Specification Sheet, printed Jun. 16, 2004.
Bindra, Ashok, "Standard Turns Monitor into I/O Hub," *Electronic Engineering Times* vol. 918, Sep. 6, 1996, p. 14.
Brentrup, "Introduction to Public Key Cryptography Demystified," Campus Technology, printed from http://www.campus-technology.com/article.asp?id=7626 on Oct. 6, 2004.
"Cables to Go," download Oct. 16, 2001 http://www.cablestogo.com/product.asp?cat%5Fid=601&sku=27028.
Crawford et al., "Sample rate conversion and bit rate reduction in the studio," IEE Colloquim on Digital Audio Signal Processing, May 22, 1991, pp. 8-1.
Derman, Glenda, "Monitors Make Net Connections," *Electronic Engineering Times*, vol. 933, 1996, pp. 60 and 69.
"ExpressBus™ FU0I 0 User Guide Packing Checklist", Belkin Components.
"FireWire", downloaded Oct. 16,2001, si_wyg:/_/4 2/http://developer.apple._ comlhardwarelFire_Wire.

"Fire Wire Connector", downloaded Oct. 16, 2001, wysiwyg:/176/http://developer.apple.com/...es/Macintosh_CPUsG3/ibook/ibook-27.html.
Fried, "FireWire poised to become ubiquitous", downloaded Oct. 16, 2001, CNET News.com, 1394 Trade Association: Press, wysiwyq:/132/http:/_113_ 94ta.org/Press/200_ 1_ Press/august!8.2_ 7.b.html.
Fried, "New Fire Wire to blaze faster trail", downloaded Oct. 16, 2001, CNET News.com, http://news.cnet.com/news/0-1006-200-6021210.html.
"How to Connect Your Computer, PC Hardware", downloaded Oct. 16, 2001, http:///www.scar.utoronto.ca!~ccweb/faculty/connect-howto.html.
"IEEE 1394/USB Comparison", downloaded Oct. 16, 2001, www.genitech.com.aulLIBRARY/TechSupportiinfobits/firewirevsusb.htm.
"Introduction to Public Key Crypotography," Oct. 9, 1998, printed from http://developer.netscape.com/docs/manuals/security/pkin/contents.htm on Oct. 6, 2004.
Lambert, "Digital Audio Interfaces," Journal of the Audio Engineering Society, Audo Engineering Society, New York, NY vol. 38, No. 9, (Sep. 1, 1990), pp. 681-684, 686, 68 XP000175146 ISSN: 1549-4950 figures 9, 10.
"Making UBS Work," downloaded Oct. 16, 2001, PC Magazine: PC Tech wysiwyg:/155/http://www.zdnet.com/pcmag/pctech/content!18/04/tu1804.001.html.
Networking Tech Note, "1394 Standards and Specifications," 3 pgs.
"PMC FW2 IEEE1394 FireWire Controller", downloaded Oct. 16, 2001, http://www.bvmltd.co.uk/PMCfw2ds.html.
Sinitsyn, Alexander, "Synchronization of Framework For Personal Mobile Servers," *Pervasive Computing and Communications Workshops (PERCOMW'04)*, Proceedings of the Second IEEE Annual Conference, Piscataway, NJ, USA, IEEE, Mar. 14, 2004, pp. 208-212.
Teener, "Understanding Fire Wire: The IEEE 1394 Standards and Specifications", downloaded Oct. 16, 2001, wysiwyg:119/http:1_lwww.chipcenter.com/networking/ieee_1394/main.html.
"The Authoritative Dictionary of IEEE Standards Terms, Seventh Edition", Published by Standards Information Network, IEEE Press.
"Universal serial bus specification—rev 2.0," XP002474828, Chapter 9, USB Device Framework, pp. 239-274.
Whittle, "Public Key Authentication Framework: Tutorial," First Principles Consulting, Jun. 2, 1996.
Vitaliano, "Why FireWire is Hot!Hot!Hot!", downloaded Oct. 16, 2001, "Impact.Fire Wire. SideBar" http://www.vxm.com/21R.35.html.
iPod Classic User's Guide, acquired from apple.com, 2002; 44 pages.
iPod nano Features Guide, acquired from apple.com, 2008; 72 pages.
iPod touch User's Guide, acquired from apple.com, 2008, 120 pages.
Microsoft, "Media Transport Protocol Implementation Details," 2005, 18 pages.
"Universal Serial Bus Specification—Rev 2.0," Chapter 6, Compaq Hewlett-Packard, Apr. 27, 2000, pp. 85, 99-100.
MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.
MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

* cited by examiner

| Pin | Signal name | I/O | Function |
|---|---|---|---|
| 1 | DGND | I | Digital ground |
| 2 | DGND | I | Digital ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance component |
| 22 | S Video C | O | Chrominance component |
| 23 | Video Composite | O | Composite signal |
| 24 | Remote Sense | I | Detect remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG.3A

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video signal |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG.3B

METHOD AND SYSTEM FOR TRANSFERRING ALBUM ARTWORK BETWEEN A MEDIA PLAYER AND AN ACCESSORY

CROSS-REFERENCE TO RELATED APPLICATIONS

This application is a Continuation-In-Part of co-pending U.S. patent application Ser. No. 10/833,689, entitled "Connector Interface System for a Multi-Communication Device", filed on Apr. 27, 2004, and assigned to the assignee of the present application.

FIELD OF THE INVENTION

The present invention relates generally to electrical devices and more particularly to electronic devices such as media players that communicate with accessory devices.

BACKGROUND OF THE INVENTION

A media player stores media assets, such as audio tracks or photos that can be played or displayed on the media player. One example of a media player is the iPod™ media player, which is available from Apple Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple, Inc.

A media player typically includes one or more connectors or ports that can be used to interface to the media player. For example, the connector or port can enable the media player to couple to a host computer, be inserted into a docking system, and/or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

With the growing number of media types, such as images, audio, video, etc., that may be transferred between a media player and an accessory, there is a need for improved techniques for transferring different types of information between media players and accessories.

SUMMARY OF THE INVENTION

A method, system, and connector interface for transferring album artwork between a media player and an accessory is disclosed. The method comprises obtaining, by the accessory, artwork information associated with album artwork from the media player and obtaining, by the accessory, the album artwork from the media player based on the artwork information.

According to the system and method disclosed herein, the media player and accessory may utilize a plurality of commands utilized in a variety of environments, such as within a connector interface system environment, to facilitate the transfer of album artwork.

BRIEF DESCRIPTION OF THE DRAWINGS

FIG. 3A illustrates connector pin designations for the docking connector.

FIG. 3B illustrates connection pin designations for the remote connector.

DETAILED DESCRIPTION OF THE INVENTION

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, media players and accessories are able to exchange album artwork using album art commands. The album art commands include commands associated with exchanging index playing track information, artwork formats, track artwork times, and artwork data. The media player and accessory may utilize the plurality of commands in a variety of environments to facilitate the transfer of album artwork. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

Figure 1A:
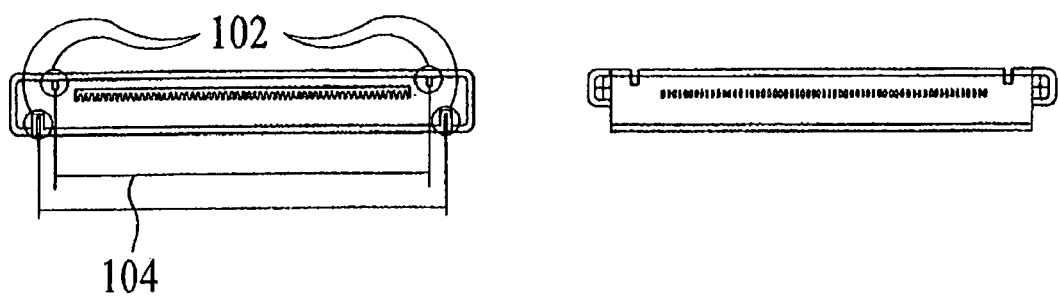
FIGS. 1A and 1B illustrate a docking connector in accordance with the present invention.
Figure 1B:
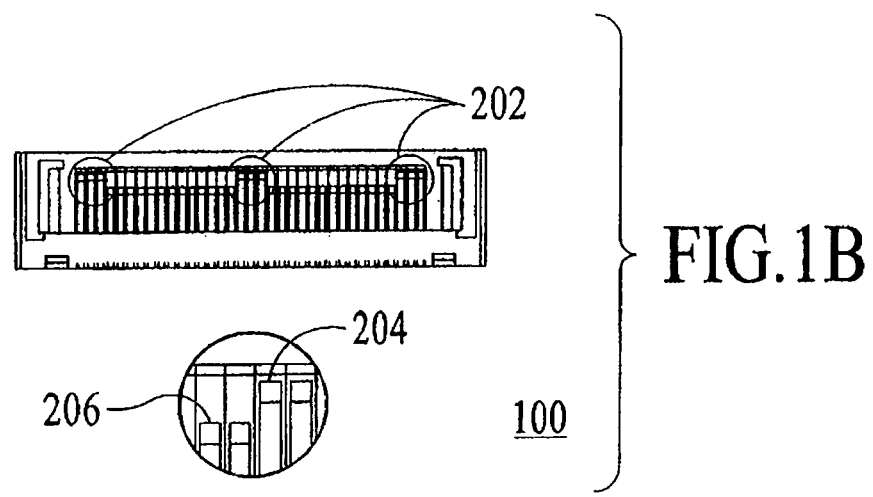

FIGS. 1A and 1B illustrate a docking connector 100 in accordance with the present invention. Referring first to FIG. 1A, the keying features 102 are of a custom length 104. In addition, a specific key arrangement is used where one set of keys is separated by one length at the bottom of the connector and another set of keys is separated by another length at the top of the connector. The use of this key arrangement prevents noncompliant connectors from being plugged in and causing potential damage to the device. The connector for power utilizes a Firewire specification for power. The connector includes a first make./last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206, minimizing internal electrical damage of the electronics of the device.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2A:
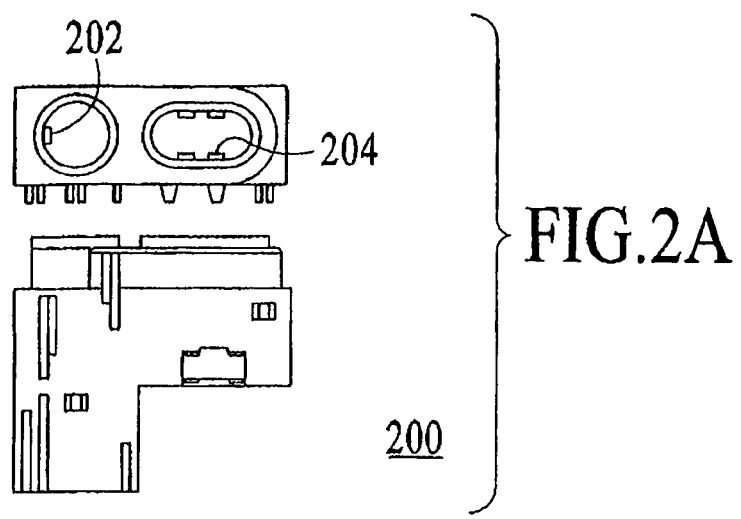
FIG. 2A is a front and top view of a remote connector in accordance with the present invention.
Figure 2B:
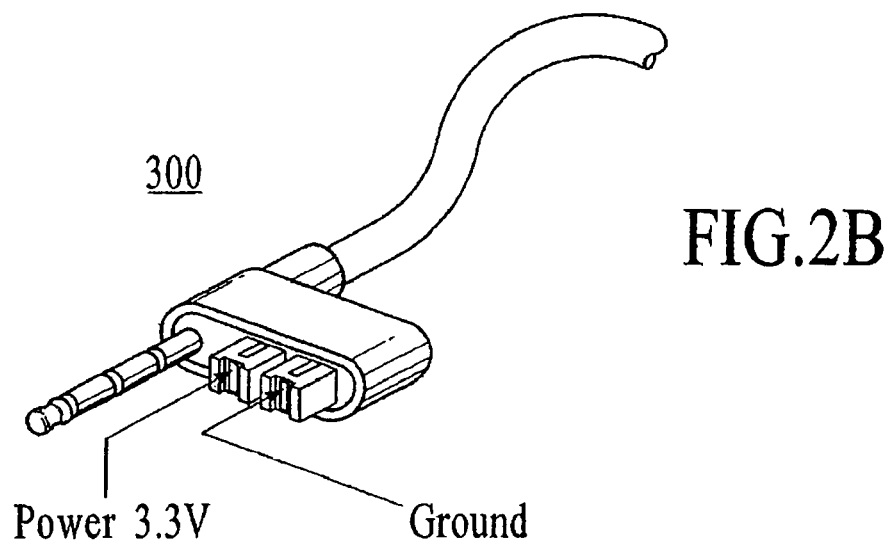
FIG. 2B illustrates a plug that can be utilized in the remote connector of FIG. 2A.
Figure 2C:
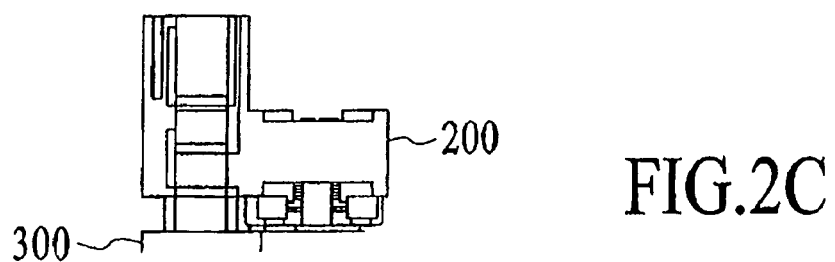
FIG. 2C illustrates the plug of FIG. 2B inserted into the remote connector of FIG. 2A.

The connection interface system also includes a remote connector which provides for the ability to output and input audio, provides I/O serial protocol, and provides an output video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the functions to be provided via the remote connector. FIG. 2C illustrates the plug 300 inserted into the remote connector 200. Heretofore, all of these features have not been implemented in a remote connector. Therefore, a standard headphone cable can be plugged in, but also special remote control cables, microphone cables, and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
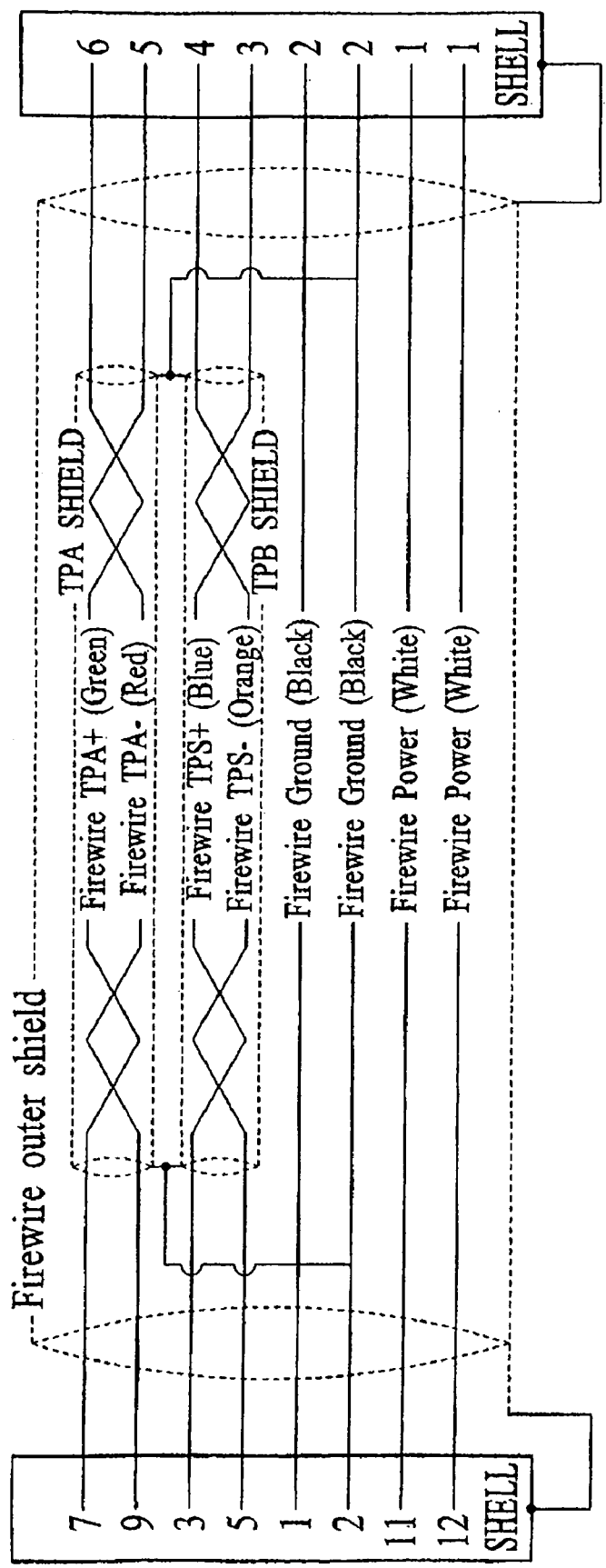
FIG. 4A illustrates a typical FireWire connector interface for the docking connector.

FIG. 4A illustrates a typical Firewire connector interface for the docking connector. The following are some exemplary specifications: Firewire power (8V-30V DC IN, 10 W Max). In one embodiment, Firewire may be designed to the IEEE 1394 A Spec (400 Mb/s).

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

Figure 4B:
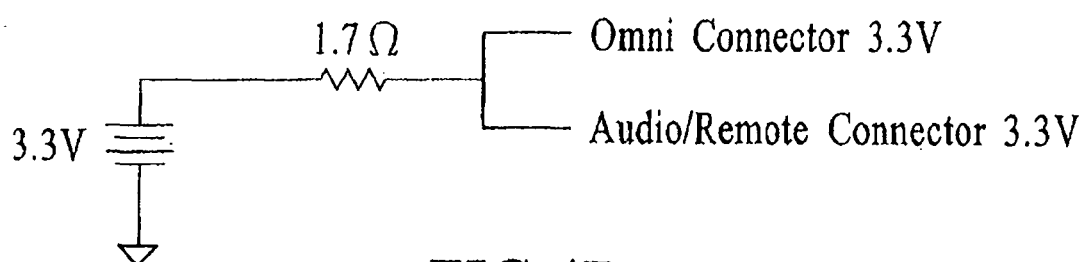
FIG. 4B illustrates a reference schematic diagram for an accessory power source.

FIG. 4B illustrates the accessory power source. The media player accessory power pin supplies voltages, for example, 3.0 V to 3.3V+/−5% (2.85 V to 3.465 V) over the docking connector and remote connector (if present). A maximum current is shared between the docking and remote connectors.

By default, the media player supplies a particular current such as 5 mA. Proper software accessory detection is required to turn on high power (for example, up to 100 mA) during active device usage. When devices are inactive, they must consume less than a predetermined amount of power such as 5 mA current.

Accessory power is grounded through the F/W GND pins.

Figure 4C:
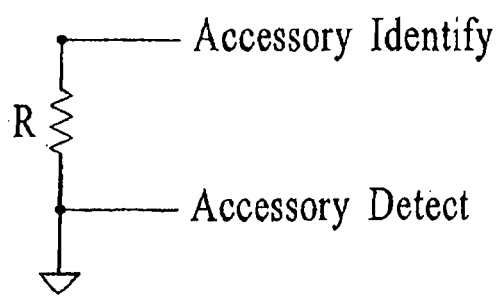
FIG. 4C illustrates a reference schematic diagram for a system for detecting and identifying-accessories for the docking connector.

FIG. 4C illustrates a reference schematic diagram for a system for detecting and identifying accessories for the docking connector. The system comprises a resistor to ground that allows the device to determine what has been plugged into the docking connector. There is an internal pullup on Accessory Identify. Two pins (Accessory Identify & Accessory Detect) are used.

a) A resistor to ground allows the device to determine what has been plugged into docking connector. There is an internal pullup on Accessory Identify.

b) Two pins required (Accessory Identify & Accessory Detect)

Figure 4D:
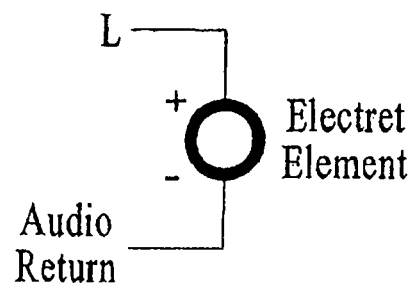
FIG. 4D is a reference schematic of an electret microphone that may be within the remote connector.

FIG. 4D is a reference schematic of an electret microphone that is within the remote connector.

Serial Protocol Communication:

a) Two pins used to communicate to and from device (Rx & Tx)

b) Input & Output (0V=Low, 3.3V=High)

Figure 5A:
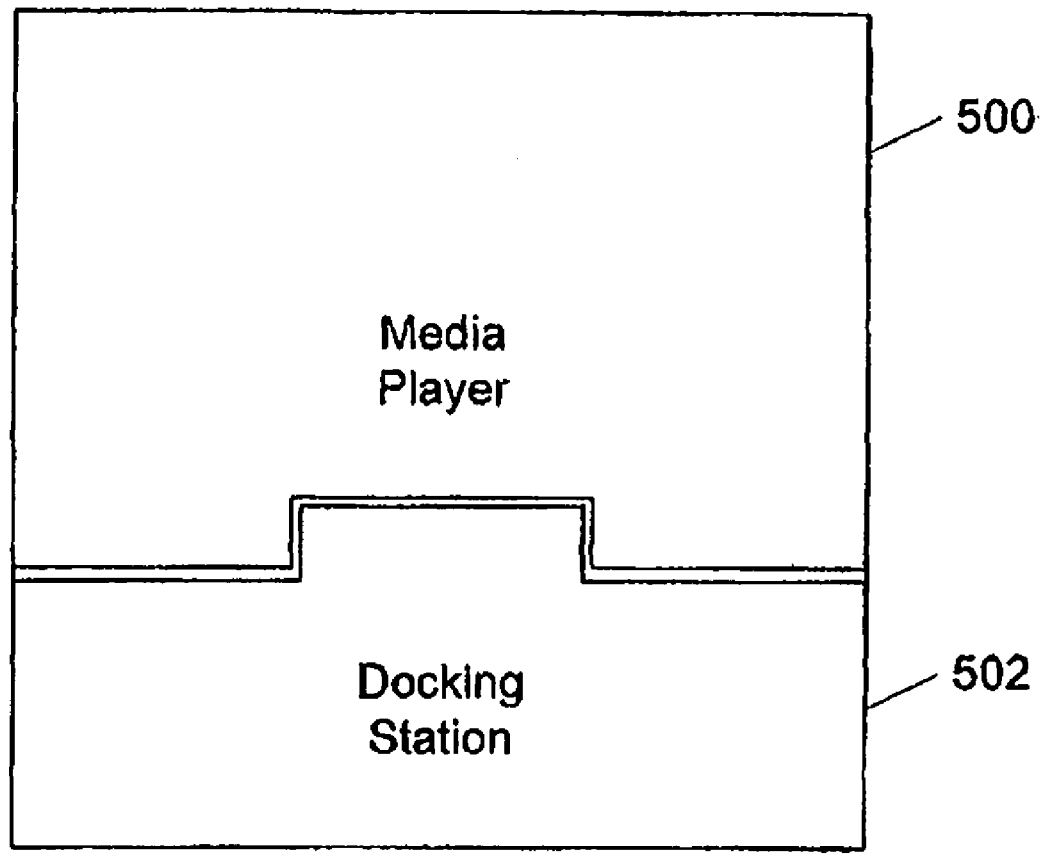
FIG. 5A illustrates a media player coupled to different accessories.
Figure 5B:
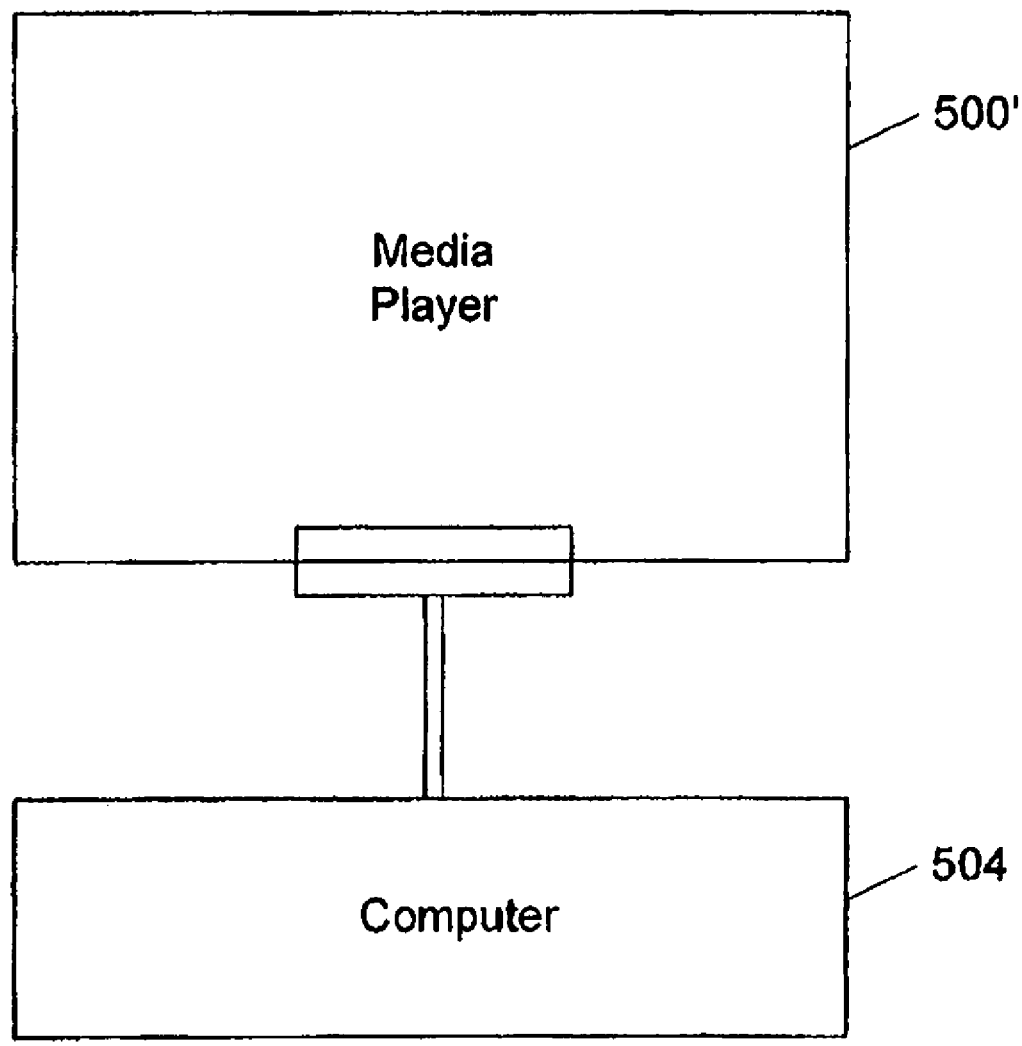
FIG. 5B illustrates the media player coupled to a computer.
Figure 5C:
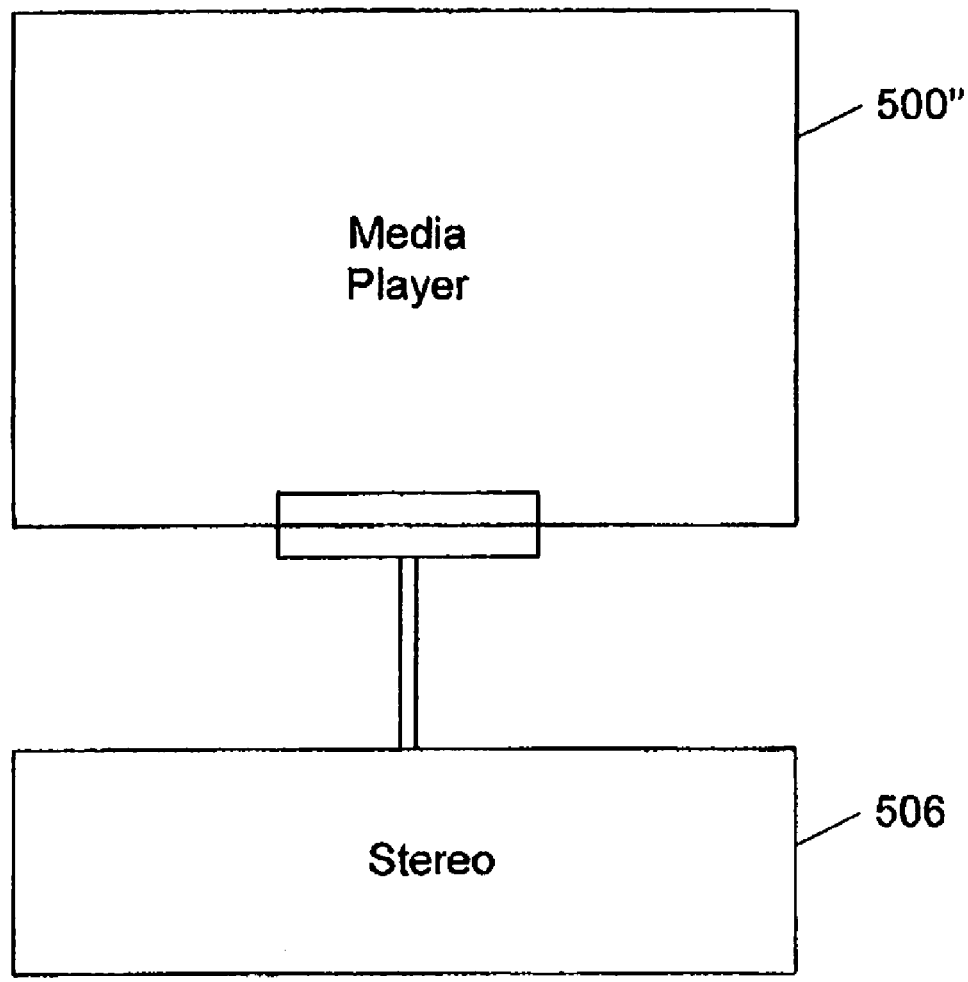
FIG. 5C illustrates the media player coupled to a car or home stereo system.
Figure 5D:
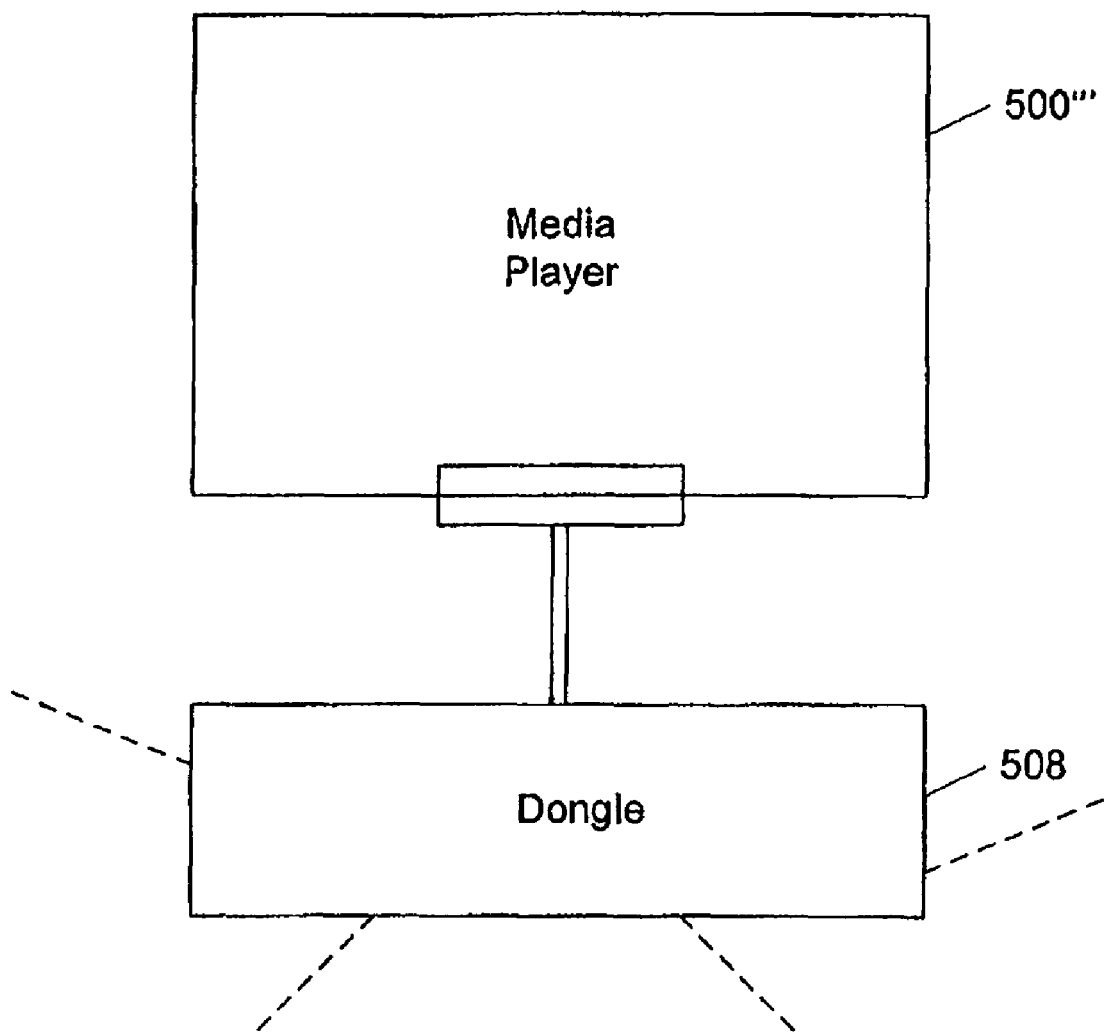
FIG. 5D illustrates the media player coupled to a dongle that communicates wirelessly with other accessories.
Figure 5E:
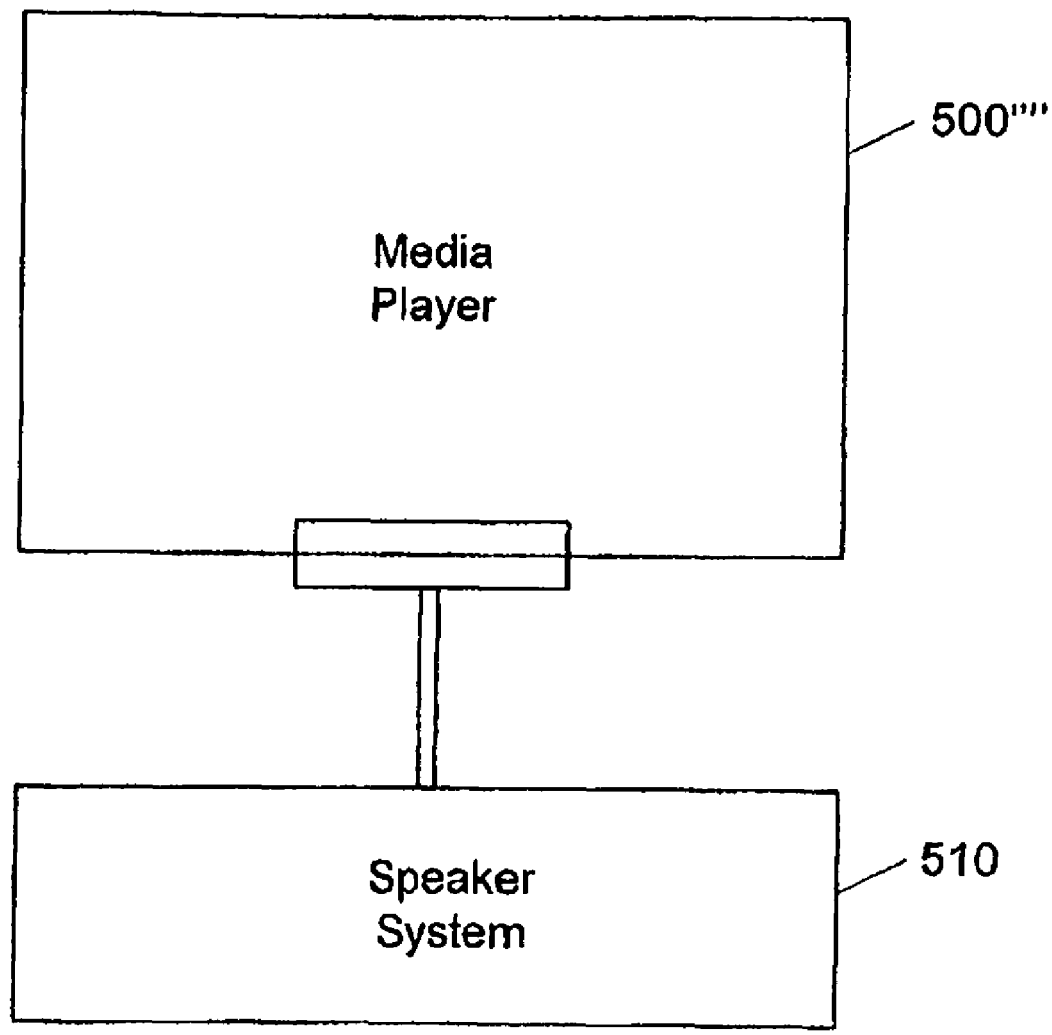
FIG. 5E illustrates the media player coupled to a speaker system.

As mentioned previously, media players connect to a variety of accessories. FIGS. 5A-5E illustrate a media player 500 coupled to different accessories. FIG. 5A illustrates a media player 500' coupled to a docking station 502. FIG. 5B illustrates the media player 500" coupled to a computer 504. FIG. 5C illustrates the media player 500''' coupled to a car or home stereo system 506. FIG. 5D illustrates the media player 500'''' coupled to a dongle 508 that communicates wirelessly with other devices. FIG. 5E illustrates the media player 500''''' coupled to a speaker system 510. As is seen, what is meant by accessories includes but is not limited to docking stations, chargers, car stereos, microphones, home stereos, computers, speakers, and accessories which communicate wirelessly with other accessories.

As mentioned previously, this connector interface system can be utilized with a command set for transferring album artwork between a media player and an accessory. In one embodiment, the accessory may be a host computer or any other electronic device or system that may communicate with the media player. It should be understood by one of ordinary skill in the art that although the above-identified connector interface system could be utilized with the command set, a variety of other connectors or systems could be utilized and they would be within the spirit and scope of the present invention. To describe the utilization of the command set in more detail refer now to the following description in conjunction with the accompanying figure.

Album Artwork Commands

Album art commands support the transfer of album artwork (e.g., artwork images) from the media player to an accessory. As described in more detail below, the media player and accessory exchange commands associated with indexed playing track information, artwork formats, track artwork times, and artwork data. Album artwork for a track (or podcast or audiobook) can come in a variety of sizes and formats. There can also be multiple images associated with various times during track playback. For the typical music track, there may be a single image at the beginning of playback. The image may be available in different sizes (e.g., small, large, etc.).

Figure 6:
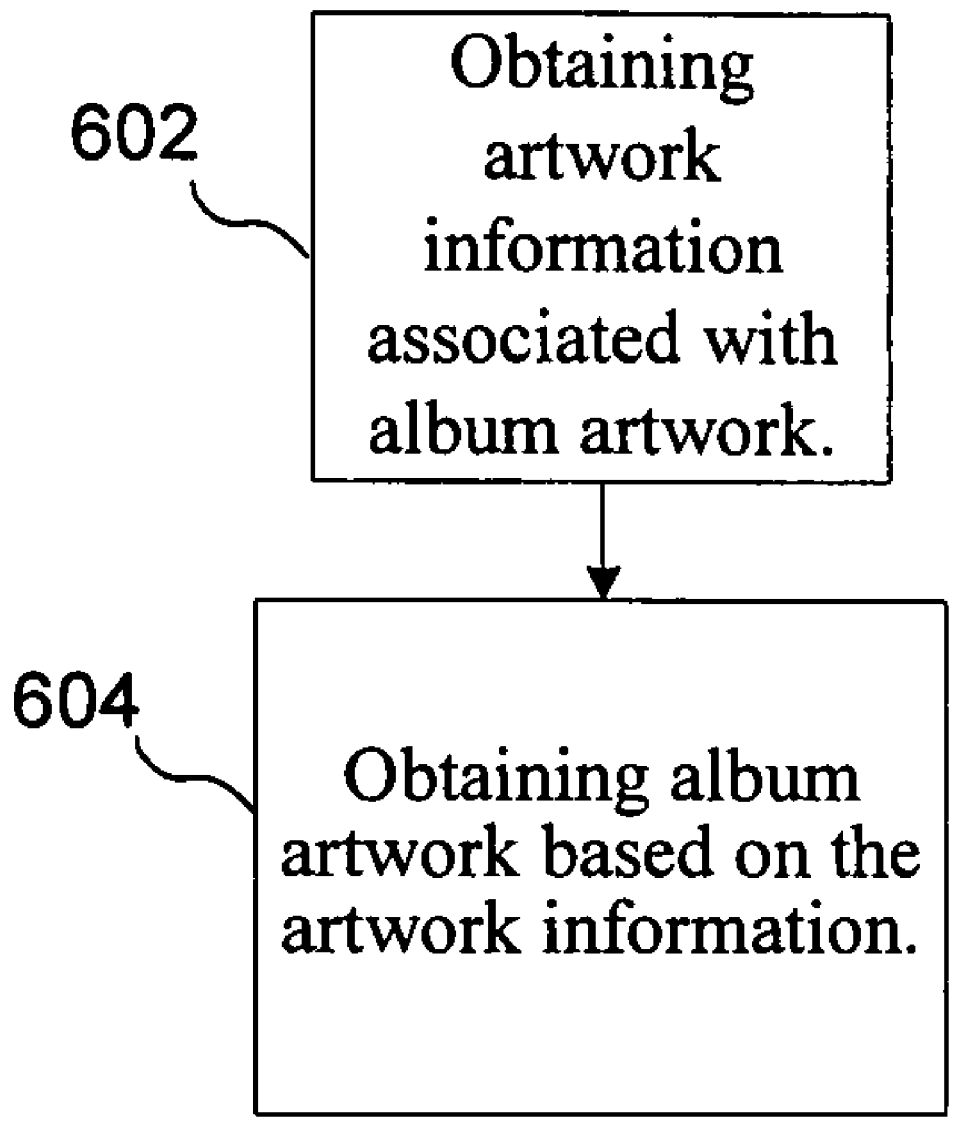
FIG. 6 is a flow chart that illustrates a process for transferring album artwork between a media player and an accessory.

FIG. 6 is a flow chart that illustrates a process for transferring album artwork between a media player and an accessory. As FIG. 6 illustrates, in step 602, the accessory obtains artwork information associated with album artwork from the media player. Next, in step 604, the accessory obtains the album artwork from the media player based on the artwork information. Each of the steps 602 and 604 are described in more detail below in FIGS. 7 and 8.

Figure 7:
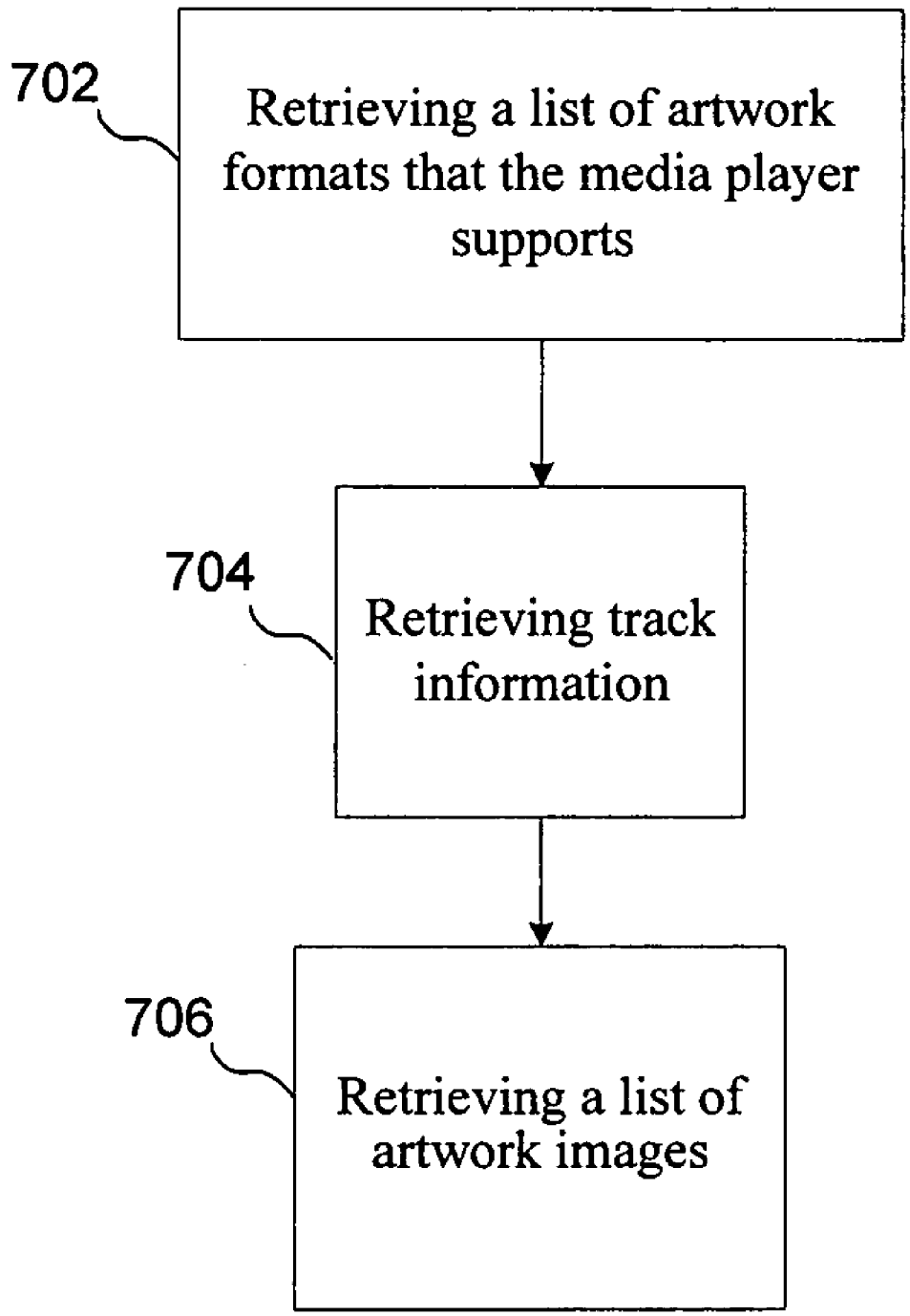
FIG. 7 is a flow chart that illustrates a process for obtaining artwork information, which may be used to implement a step of FIG. 6.

FIG. 7 is a flow chart that illustrates a process for obtaining artwork information, which may be used to implement step 602 of FIG. 6. As FIG. 7 illustrates, in step 702, the accessory retrieves from the media player a list of artwork formats that the media player supports. Next, in step 704, the accessory may obtain track information from the media player in order to retrieve album artwork for a given track. Next, in step 706, the accessory retrieves a list of artwork images from the media player. In one embodiment, the artwork images from the list are associated with one or more of an artwork format and a track.

Figure 8:
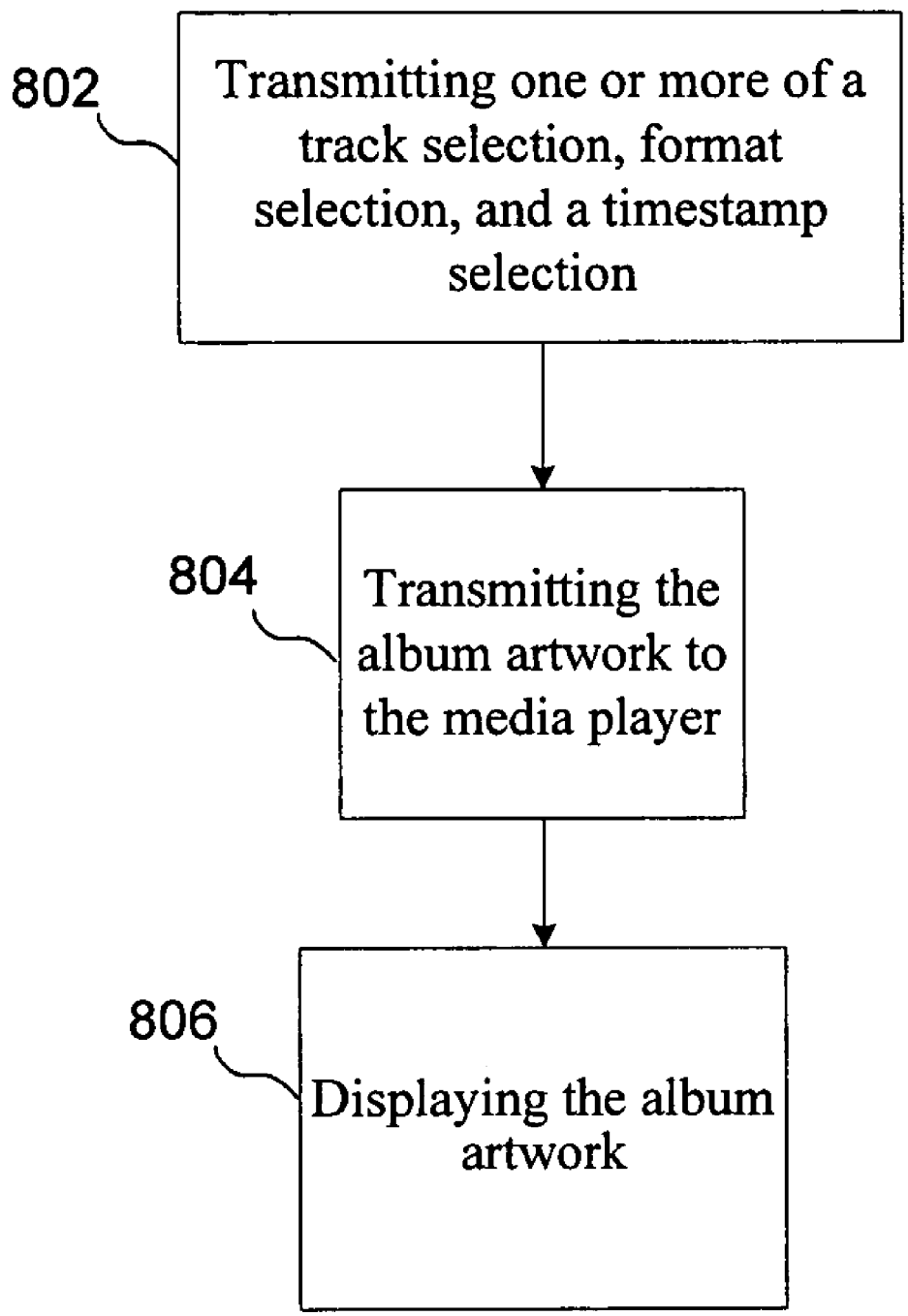
FIG. 8 is a flow chart that illustrates a process for obtaining album artwork, which may be used to implement a step of FIG. 6.

FIG. 8 is a flow chart that illustrates a process for obtaining album artwork, which may be used to implement step 604 of FIG. 6. As FIG. 8 illustrates, in step 802, the accessory transmits to the media player one or more of a track selection, format selection, and a timestamp selection associated with the desired artwork image(s). Next, in step 804, the media player transmits the album artwork to the accessory. Next, in step 806, upon receipt of the artwork image(s), the accessory may optionally display the album artwork (e.g., album artwork image(s)). Specific album artwork commands used to implement the steps of FIGS. 7 and 8 are described in detail below.

Command Functionality

Although a plurality of commands is described hereinbelow, one of ordinary skill in the art recognizes that many other commands could be utilized and their use would be within the spirit and scope of the present invention. Accordingly, the list of commands below is representative, but not exhaustive, of the types of commands that could be utilized to transfer and store data between a media player and an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Get-Artwork-Formats Command

The get-artwork-formats command requests a list of supported artwork formats (e.g., supported by the media player). In one embodiment, the get-artwork-formats command may include a get-artwork-formats command ID. In one embodiment, there is no need to retrieve artwork formats more than once per session, since the values of the get-artwork-formats command may be fixed for the duration of the session in which the accessory is in communication with the media player.

Return-Artwork-Formats Command

The return-artwork-formats command provides a list of supported formats, in response to the get-artworks-formats command. In one embodiment, the return-artwork-formats command may include a return-artwork-formats command, one or more format IDs, a pixel format, an image width, and an image height. The format IDs are used when sending a get-track-artwork-times command, described below. The image width is the number of pixels in width for each image. The image height is the number of pixels in height for each image. In one embodiment, each format ID may represent both a pixel encoding (e.g., RGB-565, little-endian) and the image dimensions. In one embodiment, some of all artwork formats may be a fixed-size.

Get-Indexed-Playing-Track-Information Command

The get-indexed-playing-track-information command requests track information to retrieve album artwork for a given track. In one embodiment, the get-indexed-playing-track-information command may include an information-type field that specifies the type of information to be returned, such as track title, artist title, artist name, album name, track genre, and track chapter information. In one embodiment, the get-indexed-playing-track-information command may also include an information-type field, and also include an artwork count request, which specifies a count of artwork available for each format associated with a given track. It is possible that a track may not have artwork for a particular format or that the number of artwork items will vary by format.

Return-Indexed-Playing-Track-Information Command

The return-indexed-playing-track-information command provides the requested track information for the specified playing track, in response to the get-indexed-playing-track-information command. In one embodiment, the return-indexed-playing-track-information command may include an information-type field that indicates the presence of artwork for a given track. The return-indexed-playing-track-information command may also include an information data field that includes one or more records listing the artwork available for the track. Each record includes a format identification (ID) followed by a count of the number of images of that format for the track. There is no requirement that the numbers be consistent across format IDs. For example, an image may have 3 images of format ID 1, 6 images of format ID 2, and 0 images of format ID 3.

Get-Track-Artwork-Times Command

The get-track-artwork-times command requests a list of artwork images, which may be associated with one or more tracks. In one embodiment, the get-track-artwork-times command may include a get-track-artwork-times command ID, one or more track indexes, a format ID, an artwork index, and an artwork count. In one embodiment, a track index may be used to select a track, and a format ID may be used to indicate which type of artwork is desired.

The artwork index specifies where to begin searching for artwork. For example, a value of 0 may indicate that the media player should start with the first available artwork. An artwork count specifies a maximum number of times to be returned. For example, a value of −1 may indicate that there is no preferred limit.

Return-Track-Artwork-Times Command

The return-track-artwork-times command provides a list of artwork images and associated timestamps for a given track. In one embodiment, the return-track-artwork-times command may include zero or more records, one for each piece of artwork associated with the track and format specified in the get-track-artwork-times command. The timestamp indicates when (e.g., in milliseconds from start of playback) a given artwork image is to be displayed.

In one embodiment, the number of records returned is no greater than the number specified in the get-track-artwork-times command. The number of records may be less than requested. This may happen if there are fewer pieces of artwork available than were requested or if the media player is unable to place all of the requested records in a single packet.

Get-Track-Artwork-Data Command

The get-track-artwork command requests the data (i.e., artwork) for a given track index, format ID, and artwork index. In one embodiment, the get-track-artwork command may include a get-track-artwork-data command ID, one or more track indexes, one or more format IDs, and one or more timestamps associated with each artwork image.

Return-Track-Artwork-Data Command

The return-track-artwork command provides the requested album artwork. Multiple return-track-artwork commands may be necessary to transfer the data. In one embodiment, the return-track-artwork command may include coordinates indicating an "inset rectangle" that describes any padding that may have been added to the image. In one embodiment, a return-track-artwork command may include: a return track artwork data command ID; one or more descriptor telegram indexes; a display pixel format code with one or more image widths in pixels; one or more image heights in pixels; one or more row sizes in bytes; one or more inset rectangle, top-left point, x values; one or more inset rectangle, top- left point, y values; one or more inset rectangle, bottom-right point, x values; one or more inset rectangle, bottom-right point, y values; and image pixel data. A descriptor telegram index uniquely identifies each packet in the return track artwork data transaction. In one embodiment, the first telegram is the descriptor telegram.

A method and system in accordance with the present invention for allowing media players and accessories to exchange album artwork using album art commands has been disclosed. The album art commands include commands associated with exchanging index playing track information, artwork formats, track artwork times, and artwork data.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A method for use in an accessory configured to be communicatively coupled to a media player, the method comprising:
    obtaining, by the accessory from the media player, a list of artwork formats supported by the media player;
    specifying, by the accessory to the media player, one of the artwork formats from the list of artwork formats supported by the media player;
    obtaining, by the accessory from the media player, a list of one or more images associated with an audio track, wherein each image in the list has a timestamp associated therewith, the timestamp indicating a time during playback of the audio track at which the image is to be displayed, and wherein the list of one or more images includes only images that are available in the specified artwork format;
    subsequently to obtaining the list of one or more images, selecting, by the accessory, an image from the list to be displayed during playback of the audio track;
    subsequently to selecting the image from the list, requesting, by the accessory, the image from the media player; and
    receiving, by the accessory, the image from the media player.

2. The method of claim 1 wherein each artwork format specifies dimensions of an image.

3. The method of claim 1 wherein each artwork format specifies a pixel format for an image.

4. The method of claim 1 further comprising, by the accessory:
    requesting from the media player a count of images associated with the track;
    receiving from the media player a count of the images separately for each of the artwork formats supported by the media player;
    selecting one of the supported formats;
    requesting from the media player the associated timestamps for at least some of the images in the selected format; and
    receiving from the media player the requested timestamps.

5. The method of claim 1 further comprising, by the accessory:
    playing the audio track; and
    during playing of the audio track, displaying the image at a time determined based on a timestamp associated with the image.

6. The method of claim 1 wherein requesting the image includes sending to the media player a request that identifies the image by reference to a track identifier and a timestamp.

7. The method of claim 1 wherein requesting the image includes sending to the media player a request identifying the image by reference to a track identifier, a timestamp, and the specified artwork format.

8. An accessory comprising:
    an interface configured to communicatively couple the accessory to a media player configured to store an audio track and one or more images associated with the audio track, wherein each of the one or more images has a timestamp associated therewith, the timestamp indicating a time during playback of the audio track at which the image is to be displayed; and
    control logic configured to:
        obtain from the media player via the interface a list of artwork formats supported by the media player;

specify to the media player via the interface one of the artwork formats from the list of artwork formats supported by the media player;

obtain from the media player via the interface a list of the one or more images associated with the audio track, wherein the list includes only images that are available in the specified artwork format;

subsequently to obtaining the list of one or more images, select an image from the list to be displayed during playback of the audio track; and subsequently to selecting the image from the list, obtain the image from the media player via the interface.

9. The accessory of claim 8 wherein the control logic is further configured to play the audio track and to display the image during playing of the audio track at a time determined based on a timestamp associated with the image.

10. The accessory of claim 8 wherein each artwork format specifies dimensions of an image.

11. The accessory of claim 8 wherein each artwork format specifies a pixel format for an image.

12. A system comprising:
a media player configured to store an audio track and one or more images associated with the audio track, wherein each of the one or more images has a timestamp associated therewith, the timestamp indicating a time during playback of the audio track at which the image is to be displayed; and
an accessory communicatively coupled to the media player,
wherein the accessory is configured to:
obtain from the media player a list of artwork formats supported by the media player;
specify to the media player one of the artwork formats from the list of artwork formats supported by the media player;
obtain from the media player a list of the one or more images associated with the audio track, wherein the list includes only images that are available in the specified artwork format;
subsequently to obtaining the list of one or more images, select an image from the list to be displayed during playback of the audio track; and
subsequently to selecting the image from the list, obtain the image from the media player.

13. The system of claim 12 wherein the accessory is further configured to play the audio track and to display the image during playing of the audio track at a time determined based on a timestamp associated with the image.

14. A machine-readable storage medium having stored thereon a series of instructions which, when executed by a processing component of an accessory configured to be communicatively coupled to a media player, cause the processing component of the accessory to:
obtain from the media player a list of artwork formats supported by the media player;
specify to the media player one of the artwork formats from the list of artwork formats supported by the media player;
obtain from the media player a list of one or more images associated with an audio track, wherein each image in the list has a timestamp associated therewith, the timestamp indicating a time during playback of the audio track at which the image is to be displayed, and wherein the list of one or more images includes only images that are available in the specified artwork format;
subsequently to obtaining the list of one or more images, select an image from the list to be displayed during playback of the audio track;
subsequently to selecting an image from the list, request the image from the media player; and
receive the image from the media player.

15. The machine-readable storage medium of claim 14 wherein the series of instructions further cause the processing component to play the audio track and to display the image during playing of the audio track at a time determined based on a timestamp associated with the image.

16. A media player comprising:
a storage device configured to store an audio track and one or more images associated with the audio track, wherein each of the one or more images has a timestamp associated therewith, the timestamp indicating a time during playback of the audio track at which the image is to be displayed;
an interface configured to communicatively couple the media player with an accessory; and
control logic configured to:
send to the accessory via the interface a list of artwork formats supported by the media player;
receive from the accessory via the interface a specification of one of the artwork formats from the list of artwork formats supported by the media player;
send to the accessory via the interface a list of the one or more images associated with audio track, wherein the list includes only images that are available in the specified artwork format;
subsequently to sending the list of the one or more images, receive from the accessory via the interface a selection made by the accessory of an image from the list to be displayed during playback of the audio track; and
subsequently to receiving the selection, send to the accessory via the interface the image.

17. A method for use in an accessory configured to be communicatively coupled to a media player, the method comprising:
obtaining, by the accessory from the media player, a list of one or more images associated with an audio track, wherein each image in the list has a timestamp associated therewith, the timestamp indicating a time during playback of the audio track at which the image is to be displayed, and wherein the obtaining includes, by the accessory:
requesting from the media player a count of the one or more images associated with the track;
receiving from the media player a count of the one or more images separately for each of a plurality of supported formats;
selecting one of the supported formats;
requesting from the media player the associated timestamps for at least some of the images in the selected format; and
receiving from the media player the requested timestamps;
subsequently to obtaining the list of one or more images, selecting, by the accessory, an image from the list to be displayed during playback of the audio track;
subsequently to selecting the image from the list, requesting, by the accessory, the image from the media player; and
receiving, by the accessory, the image from the media player.

* * * * *

UNITED STATES PATENT AND TRADEMARK OFFICE
CERTIFICATE OF CORRECTION

PATENT NO.        : 7,797,471 B2
APPLICATION NO.   : 11/476338
DATED             : September 14, 2010
INVENTOR(S)       : Jay S. Laefer et al.

It is certified that error appears in the above-identified patent and that said Letters Patent is hereby corrected as shown below:

On page 4, in column 1, under "Other Publications", line 25, delete "Micrsoft" and insert -- Microsoft --, therefor.

On page 4, in column 1, under "Other Publications", line 43, delete "Colloquim" and insert -- Colloquium --, therefor.

On page 4, in column 2, under "Other Publications", line 17, delete "Crypotography" and insert -- Cryptography --, therefor.

On page 4, in column 2, under "Other Publications", line 21, delete "Audo" and insert -- Audio --, therefor.

On page 4, in column 2, under "Other Publications", line 24, delete "UBS" and insert -- USB --, therefor.

On page 4, in column 2, under "Other Publications", line 30, before "Framework" delete "of".

In column 1, line 6-13, below "ACCESSORY," delete "CROSS-REFERENCE TO RELATED APPLICATIONS" and "This application is a Continuation-In-Part of co-pending U.S. patent application Ser. No. 10/833,689, entitled 'Connector Interface System for a Multi-Communication Device', filed on Apr. 27, 2004, and assigned to the assignee of the present application.".

In column 3, line 18, delete "make./last" and insert -- make/last --, therefor.

In column 4, line 33-37, below "are used." delete "a) A resistor to ground allows the device to determine what has been plugged into docking connector. There is an internal pullup on Accessory Identify. b) Two pins required (Accessory Identify & Accessory Detect)".

Signed and Sealed this
Twenty-fourth Day of April, 2012

David J. Kappos
*Director of the United States Patent and Trademark Office*